Patented Mar. 15, 1949

2,464,202

UNITED STATES PATENT OFFICE 2,464,202

DRYING OIL ACID ESTERS AND PROCESS OF MAKING SAME

John B. Rust, Montclair, N. J., assignor to Montclair Research Corporation, a corporation of New Jersey No Drawing. Application January 5, 1945, Serial No. 571,549

25 Claims. (Cl. 260—404.8)

This invention relates to modified drying oils and to the process for the preparation of the same. More particularly, it relates to unsaturated non-resinous polymerizable esters or drying oil acid esters consisting of a polyhydric alcohol esterified with monoalkyl ester of a polycarboxylic acid and an unsaturated fatty acid of the type derived from drying oils.

It is an object of this invention to provide modified drying oils which are heat advancing and which may be converted into insoluble, infusible masses by the application of heat or by the use of metallic driers.

It is a further object of this invention to provide an unsaturated non-resinous, polymerizable ester which is soluble in drying oils and which may be oil reactive.

It is a still further object of this invention to provide modified drying oils which may be heated with rosin esters, phenolic resins, alkyd resins, natural resins, and the like to give rapid drying coating compositions.

Other objects of this invention will become apparent from the following description:

The esters of this invention are prepared by heating together in a suitable reactor a partial ester of a polyhydric alcohol and unsaturated fatty acids, with a monoester of a monohydric unsaturated alcohol and a polycarboxylic acid, at 120°–250° C. until esterification is substantially complete as shown by its acid number of less than about 35. The partial ester of the polyhydric alcohol and drying oil acids may be formed by heating drying oil acids with an excess of polyhydric alcohol, or by heating the drying oil with polyhydric alcohol and preferably in the presence of an alcoholysis catalyst.

The products may also be prepared by heating together a partial ester of a polyhydric alcohol and unsaturated fatty acids with a monoester of a monohydric unsaturated alcohol and a polycarboxylic acid in the presence of a hydrocarbon solvent and about 1% of an acidic catalyst such as sulphuric acid, paratoluene sulphonic acid and the like, at 120°–150° C. The water of reaction is thus removed in the solvent during azeotropic distillation. The solvent is then removed by distillation under reduced pressure.

The products of this invention range from oily esters to hard, tough materials. Since these esters are readily heat convertible, their viscosity or consistency is dependent upon the heat treatment of the ester. A novel feature of these esters is the ease with which they may be converted to insoluble, infusible masses. Thus, for instance, a drying oil may be prepared possessing any desired low gel time. The gel time is the time required to gel a given quantity of ester at a specific temperature. Also, these esters may be blended with various drying oils or semi-drying oils such as linseed oil, cottonseed oil, castor oil, sunflower seed oil, soya bean oil, fish oils and the like, in appropriate proportions to secure drying oils which approximate raw China-wood oil in gel time, color and drying characteristics.

These esters may be blended with cellulose esters such as nitrocellulose to give hard, tough, flexible air drying coatings. They may also be used to modify rosin esters, phenolic resins, urea-formaldehyde resins, melamine - formaldehyde resins, polystyrene, polymethyl methacrylate, polyacrylonitrile, and the like to obtain products useful to those skilled in the art.

Among the polyhydric alcohols desirable in the formulation of these esters are pentaerythritol, polypentaerythritol, glycerol, diethylene glycol, sorbitol, mannitol, and the like.

Among the unsaturated fatty acids desirable in the formulation of these esters are cottonseed oil fatty acids, dehydrated castor oil fatty acids, linseed oil fatty acids, China-wood fatty acids, soya bean fatty acids, menhaden fish oil acids and the like. Part of the unsaturated fatty acid may be replaced by rosin or other natural resin acids.

The polyhydric alcohol and the unsaturated fatty acids are combined in such a way as to form a drying oil fatty acids-polyhydric alcohol ester containing free hydroxyl groups, this being done by reacting drying oil fatty acids with an excess of polyhydric alcohol or by heating a drying oil with a polyhydric alcohol (which need not be glycerol). The drying oil fatty acids-polyhydric alcohol ester then is heated with a dicarboxylic acid monoester of an unsaturated monohydric alcohol containing from 3 to 4 carbons to form the esters of the present invention, the heating being at between 120° and about 250° C. until the acid number is less than about 35. The unsaturated monohydric alcohol monoesters are those of allyl, methallyl and crotyl alcohols and such polycarboxylic acids as maleic, fumaric, itaconic, citraconic, phthalic, succinic, sebacic, and the like. Also may be included the monoesters of allyl or methallyl alcohol and the Diels-Alder reaction products of conjugated dienes such as cyclopentadiene, isoprene, butadiene and the like, with unsaturated dicarboxylic acids such as maleic anhydride, fumaric acid and the like.

The following examples are given in the way of illustration only and should not be limited, as deviations are possible within the scope of the invention.

Example 1

1960 parts of linseed oil acids and 322 parts of glycerol are heated together in a 3-neck flask equipped with a thermometer, agitator, and air condenser to 200° C. Heating thereafter is continued at 220°–230° C. for 6 hours. 546 parts of monoallyl maleate is added and heating continued as follows:

160°–180° C. for 1½ hours, and
200°–220° C. for 4 hours

A light-colored, viscous oil is secured which possesses an acid number of 28 and a gel time of 10 minutes. The gel time is determined by immersing a test tube containing 20 parts of oil in a tricresyl phosphate bath at 290° C., the temperature of the bath being maintained at 280° C.–290° C. until the oil is gelled.

25 parts of ester gum and 75 parts of the above oil are heated together to 260° C. over a period of 35 minutes. The resulting varnish base when cold could be drawn into a string 18 inches in length. It is thinned with 100 parts of V. M. and P. naphtha to which is added 0.3% lead, 0.03% manganese, and 0.01% cobalt driers (as naphthenates) based on the oil content of the varnish base. The resulting varnish is light colored and dries to a dust-free film in 1¼ hours, and tack-free in 5½ hours. After air drying for 48 hours the film possesses a Sward hardness of 53.

Example 2

70 parts of the ester of Example 1 and 30 parts of raw linseed oil are heated together to 200° C. A clear oil is secured which possesses a gel time of 39 minutes.

20 parts of ester gum and 40 parts of this oil are heated together to 290° C. and held at this temperature for 15 minutes. The resulting varnish base when cold can be drawn into a string 18 inches in length. It is thinned with 60 parts of V. M. and P. naphtha to which is added 0.3% lead, 0.03% manganese, and 0.01% cobalt drier (as naphthenates). The resulting varnish is light-colored and dries to a dust-free film in 1 hour and tack-free in 6½ hours. After air drying for 48 hours the film possesses a Sward hardness of 63.

Example 3

39 parts of raw linseed oil and 23 parts of glycerol are heated together in a 3-neck flask equipped with a thermometer, agitator, and air condenser, at 260° C. for 2 hours. 117 parts of monoallyl maleate are added and heating continued at 200°–250° C. for 2½ hours. A light-colored, viscous oil is secured possessing an acid number of 17.8. The oil has a gel time of 20 minutes.

Example 4

439 parts of raw linseed oil and 7.65 parts of glycerol are heated together in a 3-neck flask equipped with a thermometer, agitator and air condenser, at 260° C., for 2 hours. 39 parts of monoallyl maleate are added and heating continued at 240°–250° C. for 3 hours. A light-colored, viscous oil is secured, possessing an acid number of 12.1. The oil possesses a gel time of 38 minutes.

33 parts of Pentalyn G (a rosin pentaerythritol ester) and 66 parts of the above oil are heated together at 260°–265° C. for 20 minutes. The resulting varnish base when cold can be drawn into a string 18 inches in length. It is thinned with 99 parts of V. M. and P. naphtha to which is added: 0.3% lead, 0.03% manganese, and 0.01% drier cobalt (as naphthenates) based on the oil content of the varnish base. A light-colored varnish is secured which air dries to a dust-free film in 1 hour, and tack-free in 5 hours. After 48 hours the varnish film possesses a Sward hardness of 63.

Example 5

200 parts of raw soya bean oil and 4.35 parts of pentaerythritol are heated together in a 3-neck flask equipped with a thermometer, agitator, and air condenser, at 240°–250° C. for 3 hours. 18.15 parts of monoallyl maleate is added and heating continued at 180°–200° C. for 4½ hours. The resulting oil is clear, light-colored and viscous, and it possesses an acid number of 12.0. The oil has a gel time of 28 minutes. A film of this oil containing 0.3% lead, 0.03% manganese, and 0.01% cobalt and naphthenates baked to a hard, tough film at 120° C. in 15 minutes. A film of oil containing driers air dried to a firm, non-tacky film in 15 hours.

Example 6

168 parts of raw soya bean oil acids and 27.2 parts of pentaerythritol are heated together in a 3-neck flask equipped with a thermometer, agitator, and air condenser at 230°–240° C. for 3 hours. 31.2 parts of monoallyl maleate are added and heating continued for 4½ hours at 180°–200° C. A light-colored oil is secured which possesses an acid number of 17 and a gel time of 14 minutes.

Example 7

126 parts of soya bean oil acids and 20.7 parts of glycerol are heated together in a 3-neck flask equipped with a thermometer, agitator and air condenser at 230°–240° C. for 3 hours. 49.5 parts of the monoallyl ester of cyclopentadiene-maleic adduct are added and heating continued at 170°–180° C. for 4 hours. A light-colored oil is secured which possesses an acid number of 14 and a gel time of 10 minutes.

A sample of oil containing 0.3% lead, 0.03% manganese, and 0.01% cobalt (as naphthenates) air dries to a non-tacky, hard film in 15 hours.

Example 8

177.9 parts of a partial ester of linseed oil acids and glycerine (containing 2 moles of linseed oil acids per mole of glycerol) and 56 parts of the monomethallyl ester of 3-methyltetrahydrophthalic acid are heated together in a 3-neck flask equipped with a thermometer, agitator, and air condenser at 240°–250° C. for 4½ hours. A clear, light-colored oil is secured possessing an acid number of 21 and a gel time of 27 minutes.

Example 9

219.5 parts of menhaden fish oil, 11.0 parts of limed rosin, and 11.5 parts of glycerol are heated together in a 3-neck flask equipped with a thermometer, agitator, and air condenser, at 260° C. for 2 hours. 58.5 parts of monoallyl maleate are added and heating continued at 200°–250° C. for 2½ hours. A light-colored oil is secured, possessing an acid number of 19 and a gel time of 30 minutes.

25 parts of pentaerythritol tetraabietate resin (Pentalyn C) and 50 parts of the above are heated together at 270°–285° C. for 15 minutes. The varnish base could be drawn into a string 18 inches in length. It is thinned with 75 parts of V. M. and P. naphtha to which is added 0.3% lead, 0.03% manganese, and 0.01% cobalt drier (as naphthenates based upon the oil). A light-colored clear varnish is secured which air dries to a dust-free film in 1¼ hours and tack-free in 5 hours. After drying for 48 hours the varnish possesses a Sward hardness of 21.

*Example 10*

190.8 parts of soya bean oil acids-glycerine ester (containing 2 moles of oil acids esterified with 1 mole of glycerol), 46.8 parts of monoallyl maleate, 2 parts of paratoluene sulphonic acid, and 150 parts of toluol are refluxed together at 120° C., while azeotropically removing the water of reaction as formed. The oil is washed with water and further heated at 120° C. under reduced pressure to remove the water and toluol. A clear oil is secured which possesses an acid number of 27 and a gel time of 59 minutes.

*Example 11*

187 parts of menhaden oil acids and 31 parts of glycerol are heated together at 250°–260° C. for 2 hours. 68.7 parts of monoallyl phthalate are added and heating continued at 180°–200° C. for 2 hours and finally at 200° C.–250° C. for 4¼ hours. A light-colored oil is secured which possesses an acid number of 32 and a gel time of 33 minutes.

*Example 12*

35 parts of WW rosin, 9.2 parts of glycerol, and 56 parts of soya bean oil acids are heated together in a 3-neck flask equipped with a thermometer, stirrer and air condenser for 2 hours at 260° C. 18.8 parts of monoallyl itaconate are added and heating continued at 180°–200° C. for 2 hours and finally at 200°–250° C. for one hour. A light-colored, viscous varnish base is secured. To 50 parts of the varnish base is added 50 parts of V. M. and P. naphtha containing 0.3% lead, 0.03% manganese, and 0.01% cobalt drier (as naphthenates) based on the oil content of the varnish base. The resulting varnish air dries to a dust-free film in 1½ hours and is tack-free after 6 hours.

I claim:

1. The process of making a modified drying oil which is color stable and fast drying, which comprises heating, at between 120° C. and about 250° C. until the acid number is below 35, a drying oil acids-polyhydric alcohol ester containing free hydroxyl groups, with a dicarboxylic acid monoester of an unsaturated monohydric alcohol containing from 3 to 4 carbons.

2. The process of making a modified drying oil which is color stable and fast drying, which comprises heating, at between 120° C. and about 250° C. until the acid number is below 35, a drying oil acids-polyhydric alcohol ester containing free hydroxyl groups and formed by heating drying oil acids with an excess of polyhydric alcohol, with a dicarboxylic acid monoester of an unsaturated monohydric alcohol containing from 3 to 4 carbons.

3. The process of making a modified drying oil which is color stable and fast drying, which comprises heating, at between 120° C. and about 250° C. until the acid number is below 35, a drying oil acids-polyhydric alcohol ester containing free hydroxyl groups and formed by heating a drying oil with a polyhydric alcohol, with a dicarboxylic acid monoester of an unsaturated monohydric alcohol containing from 3 to 4 carbons.

4. The process of claim 1 wherein the drying oil acids-polyhydric alcohol ester is formed from drying oil fatty acids and an excess of glycerol.

5. The process of claim 1 wherein the drying oil acids-polyhydric alcohol ester is formed from a drying oil and glycerol.

6. The process of claim 1 wherein the drying oil acids-polyhydric alcohol ester is formed from linseed oil and glycerol.

7. The process of claim 1 wherein the drying oil acids-polyhydric alcohol ester is formed from linseed fatty acid and a polyhydric alcohol.

8. The process of claim 1 wherein the drying oil acids-polyhydric alcohol ester is formed from linseed oil and a polyhydric alcohol.

9. The process of claim 1 wherein the drying oil acids-polyhydric alcohol ester is formed from soya bean oil and a polyhydric alcohol.

10. The process of claim 1 wherein the dicarboxylic acid monoester is monoallyl maleate.

11. As a new article of manufacture, a modified drying oil which is color stable and fast drying and which comprises the esterified product of a mixture of (a) a drying oil fatty acids-polyhydric alcohol ester containing free hydroxyl groups and (b) a dicarboxylic acid monoester of an unsaturated monohydric alcohol containing 3 to 4 carbons.

12. The product of claim 11 wherein the drying oil fatty acids-polyhydric alcohol ester is formed from drying oil fatty acids and an excess of glycerol.

13. The product of claim 11 wherein the drying oil fatty acids-polyhydric alcohol ester is formed from a drying oil and glycerol.

14. The product of claim 11 wherein the drying oil fatty acids-polyhydric alcohol ester is formed from linseed oil fatty acids and a polyhydric alcohol.

15. The product of claim 11 wherein the drying oil fatty acids-polyhydric alcohol ester is formed from linseed oil and a polyhydric alcohol.

16. The product of claim 11 wherein the drying oil fatty acids-polyhydric alcohol ester is formed from soya bean oil and a polyhydric alcohol.

17. The product of claim 11 wherein the dicarboxylic acid monoester is monoallyl maleate.

18. The process of making a modified drying oil which is color stable and fast drying, which comprises heating, at between 120° C. and about 250° C. until the acid number is below 35, a drying oil acids-polyhydric alcohol ester containing free hydroxyl groups, with an unsaturated aliphatic dicarboxylic acid monoester of an unsaturated monohydric alcohol containing from 3 to 4 carbons.

19. The process of claim 18, in which the drying oil acids-polyhydric alcohol ester is a linseed oil-glycerol ester and the monoester is monoallyl maleate.

20. The process of claim 18, in which the drying oil acids-polyhydric alcohol ester is a linseed acids-glycerol ester and the monoester is monoallyl maleate.

21. The process of claim 18, in which the drying oil acids-polyhydric alcohol ester is soya-pentaerythritol ester and the monoester is monoallyl maleate.

22. As a new article of manufacture, a modified drying oil which is color stable and fast drying and which comprises the esterified product of a mixture of (a) a drying oil fatty acids-polyhydric alcohol ester containing free hydroxyl groups and (b) an unsaturated aliphatic dicarboxylic acid monoester of an unsaturated monohydric alcohol containing 3 to 4 carbons.

23. The product of claim 22, in which the drying oil acids-polyhydric alcohol ester is a linseed oil-glycerol ester and the monoester is monoallyl maleate.

24. The product of claim 22, in which the drying oil acids-polyhydric alcohol ester is linseed acids-glycerol ester and the monoester is monoallyl maleate.

25. The product of claim 22, in which the drying oil acids-polyhydric alcohol ester is soya-pentaerythritol ester and the monoester is monoallyl maleate.

JOHN B. RUST.

REFERENCES CITED

The following references are of record in the file of this patent:

UNITED STATES PATENTS

| Number | Name | Date |
| --- | --- | --- |
| 2,044,747 | Ott et al. | June 16, 1936 |
| 2,063,855 | Roseblum | Dec. 8, 1936 |
| 2,280,242 | Kropa et al. | Apr. 21, 1942 |
| 2,280,256 | Patterson | Apr. 21, 1942 |
| 2,280,862 | Sorenson | Apr. 28, 1942 |
| 2,315,708 | Hovey | Apr. 6, 1943 |
| 2,360,393 | Burrell | Oct. 17, 1944 |
| 2,363,016 | Oertling | Nov. 21, 1944 |